Jan. 27, 1959　　　B. G. THOMPSON　　　2,870,806
WOODWORKING GROOVE CUTTING MACHINE
Filed Oct. 8, 1956　　　　　　　　　　　6 Sheets-Sheet 1

INVENTOR.
Barney G. Thompson
BY Chas. Denegre
Attorney

Jan. 27, 1959   B. G. THOMPSON   2,870,806
WOODWORKING GROOVE CUTTING MACHINE
Filed Oct. 8, 1956   6 Sheets-Sheet 2

INVENTOR.
Barney G. Thompson
BY Chas. Denegre
Attorney.

Jan. 27, 1959  B. G. THOMPSON  2,870,806
WOODWORKING GROOVE CUTTING MACHINE
Filed Oct. 8, 1956  6 Sheets-Sheet 5

INVENTOR.
Barney G. Thompson
BY Chas. Derregre
Attorney

Jan. 27, 1959 B. G. THOMPSON 2,870,806
WOODWORKING GROOVE CUTTING MACHINE
Filed Oct. 8, 1956 6 Sheets-Sheet 6
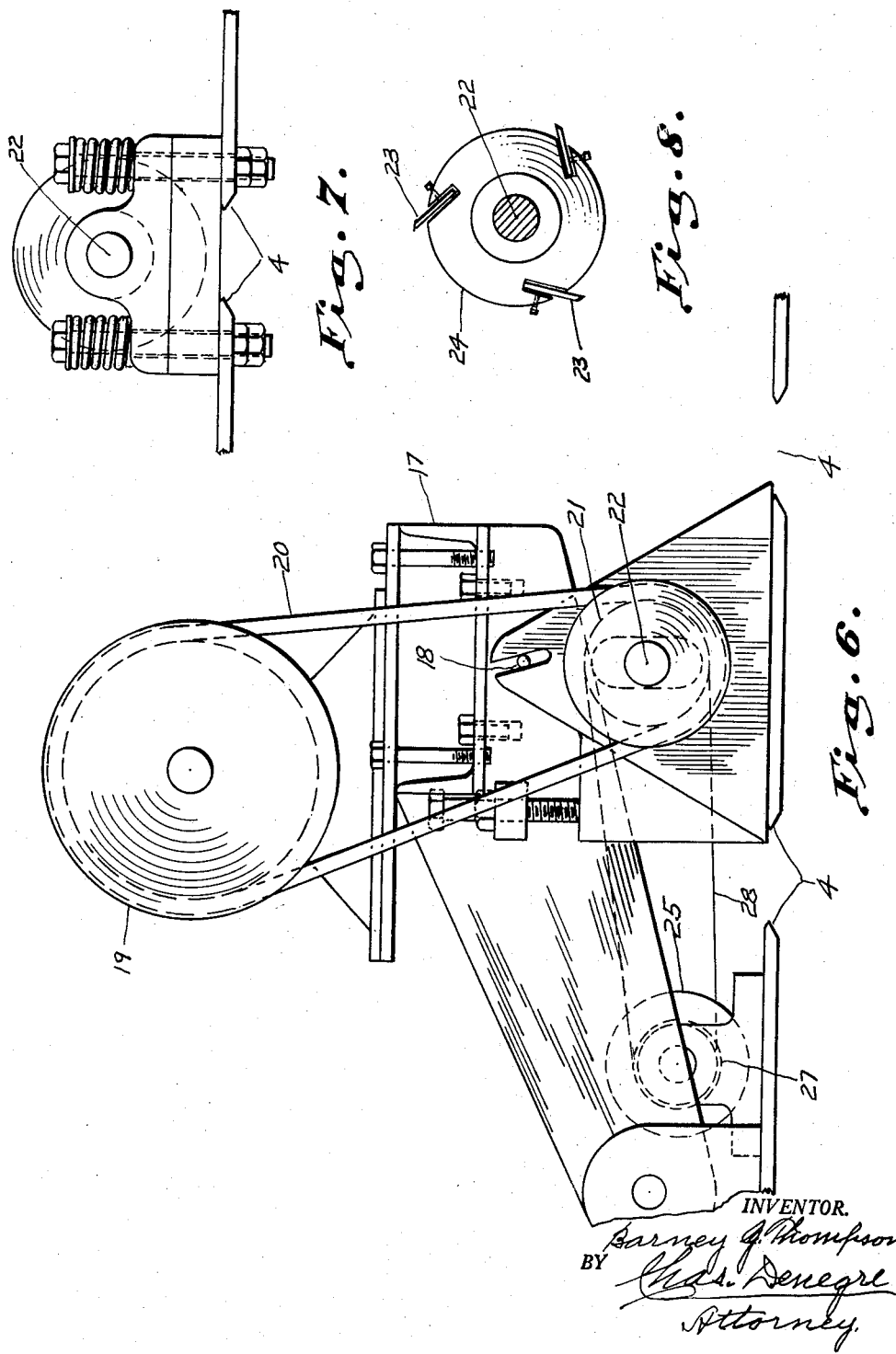
INVENTOR.
Barney G. Thompson
BY Chas. Denegre
Attorney.

United States Patent Office 2,870,806
Patented Jan. 27, 1959

2,870,806

WOODWORKING GROOVE CUTTING MACHINE

Barney G. Thompson, Birmingham, Ala.

Application October 8, 1956, Serial No. 614,521

2 Claims. (Cl. 144—136)

This invention relates to a groove cutting machine. It has for its main objects to provide such a machine that will be highly satisfactory for the purpose intended, simple in structure, comparatively cheap to manufacture, easy to keep in working condition, adapted for operation by a person of ordinary mechanical skill, and extremely durable.

The machine is especially intended for cutting grooves in plywood and the like, but may be used for cutting grooves in other flat material suitable for cutting by revolving blades.

A further object is to provide a machine adapted for forming a plurality of substantially square or oblong shaped designs adjacent each other in plywood or the like by first cutting parallel grooves in a sheet of plywood or the like, then passing the sheet again through the machine with the groove cutters crossing the previously made grooves at an angle of 90 degrees to thus form the square or oblong shapes between the grooves.

Other objects and advantages will appear from the drawings and description.

Figure 1:
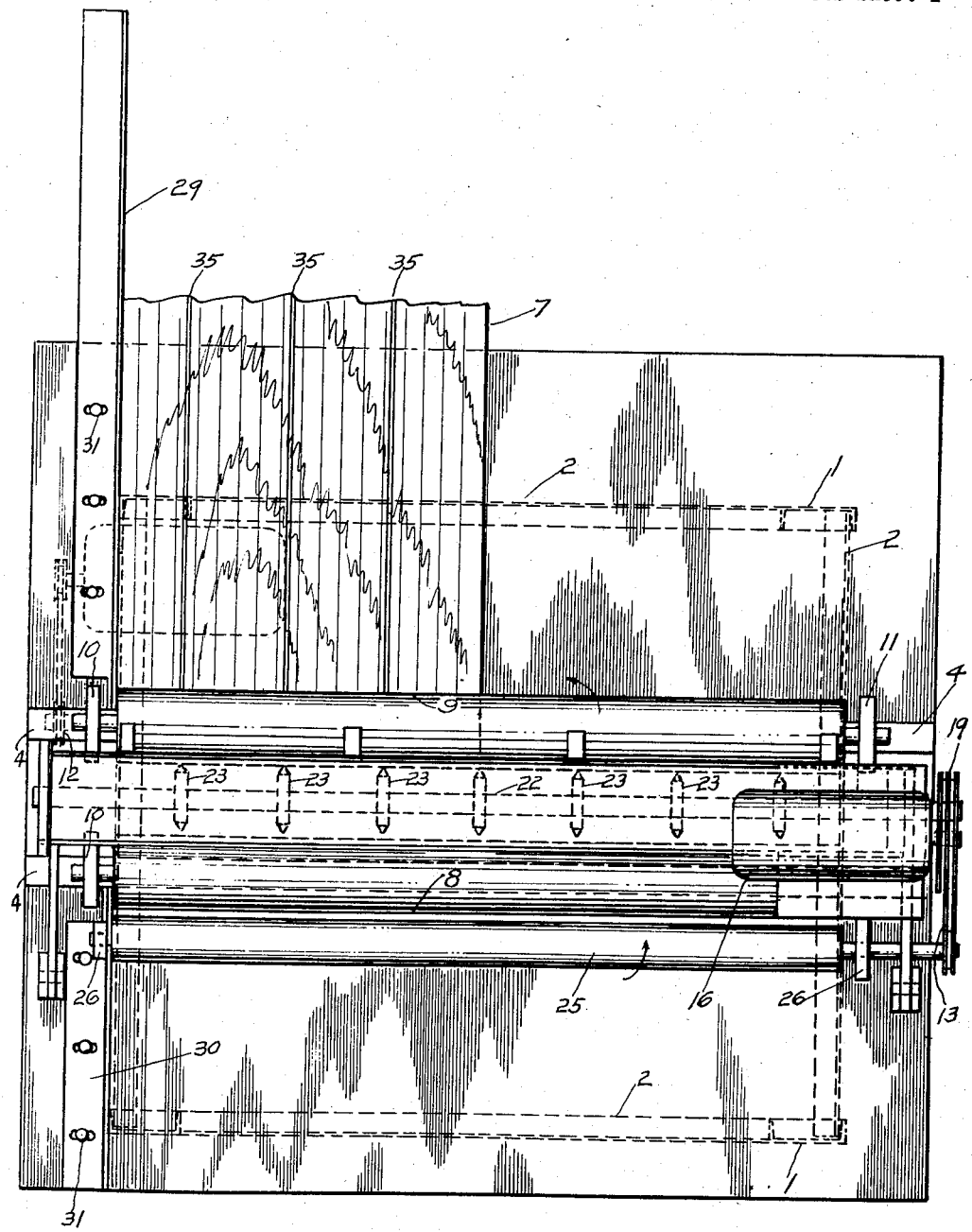
Figure 2:
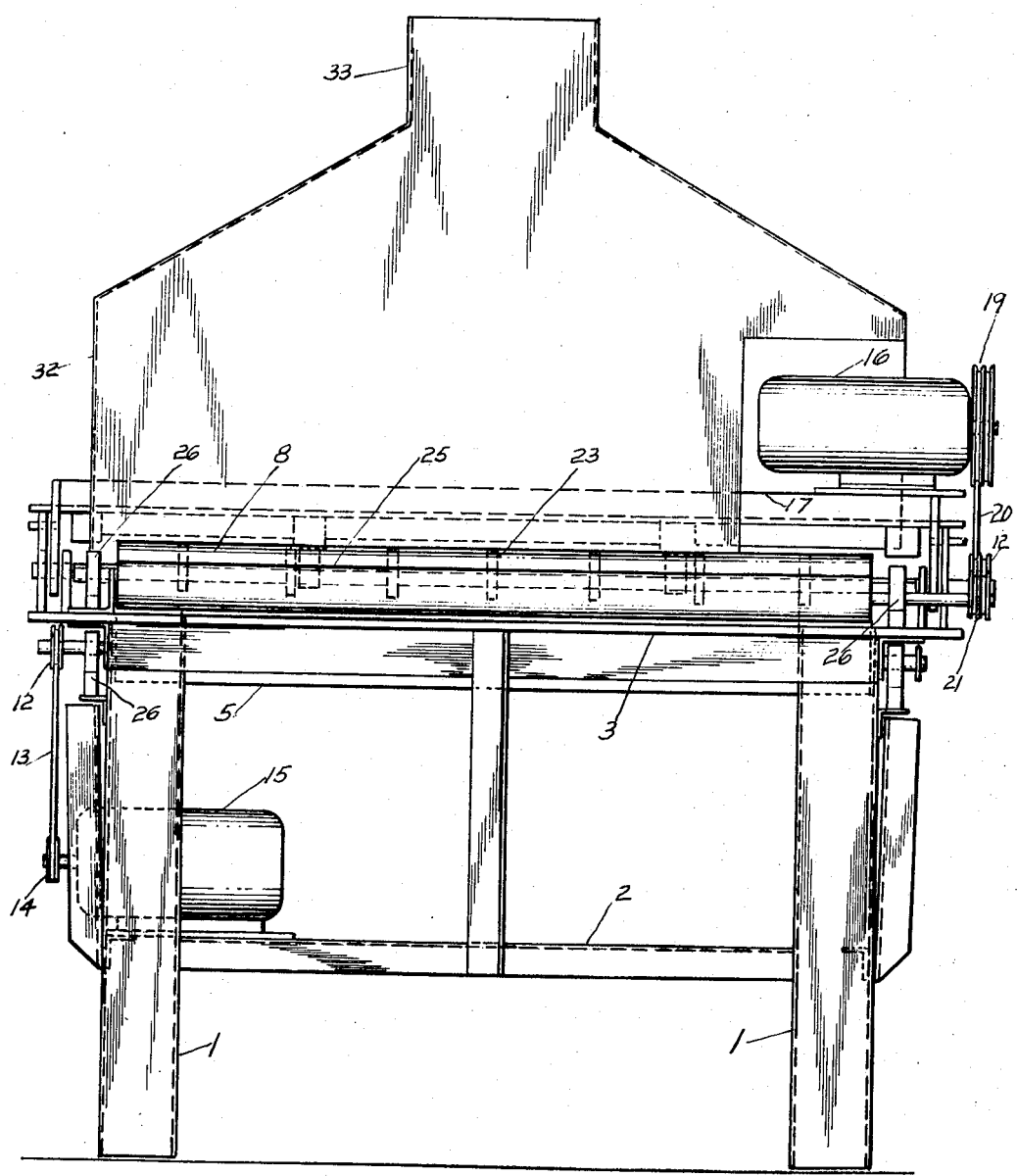
Figure 3:
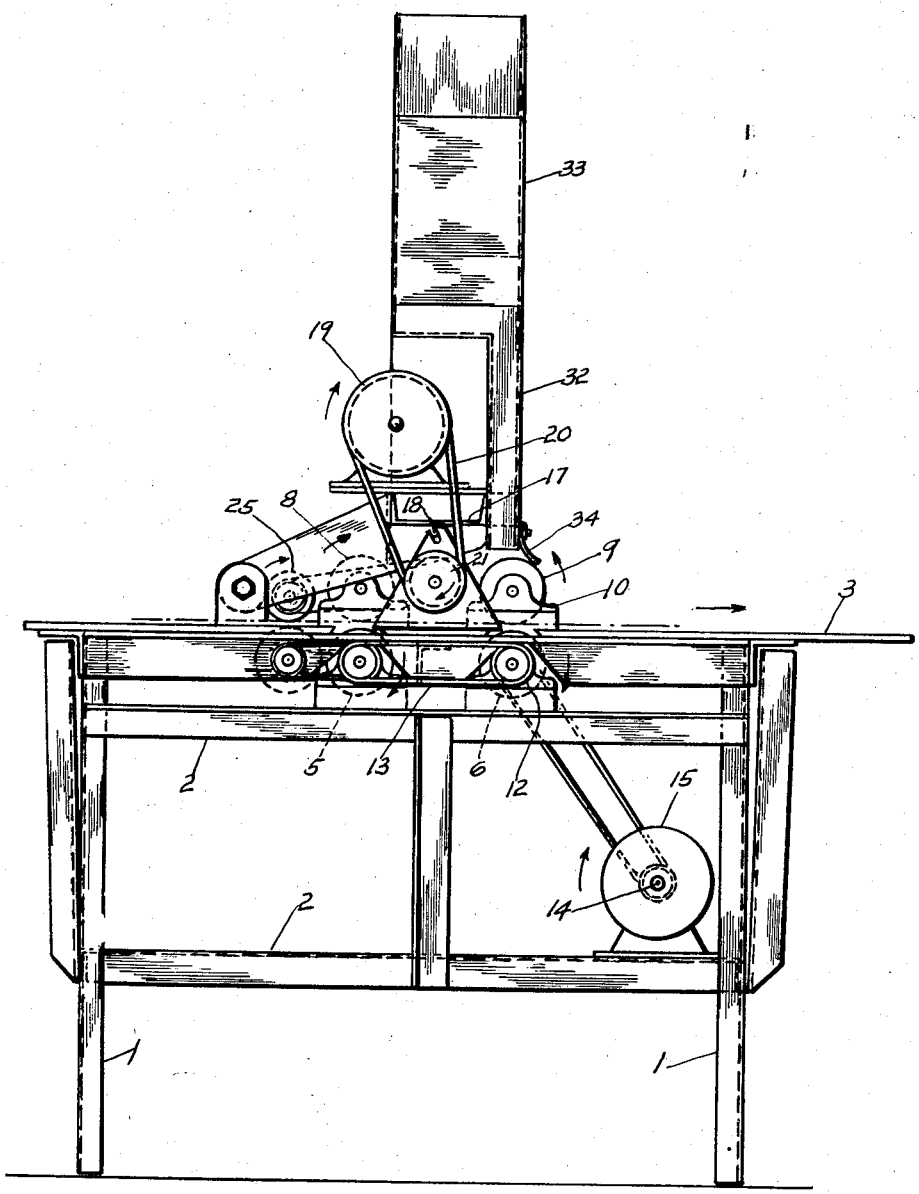
Figure 4:
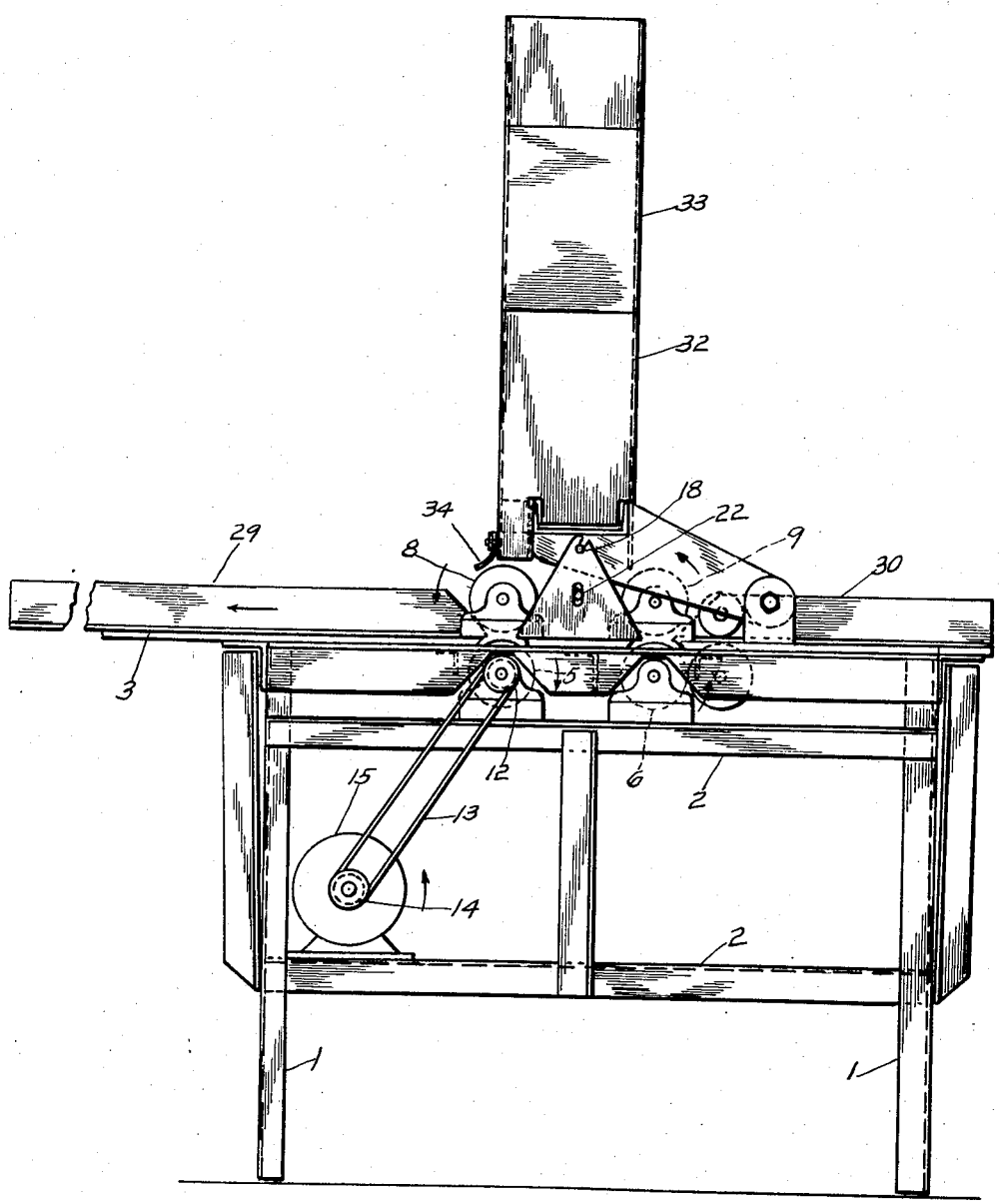
Figure 5:
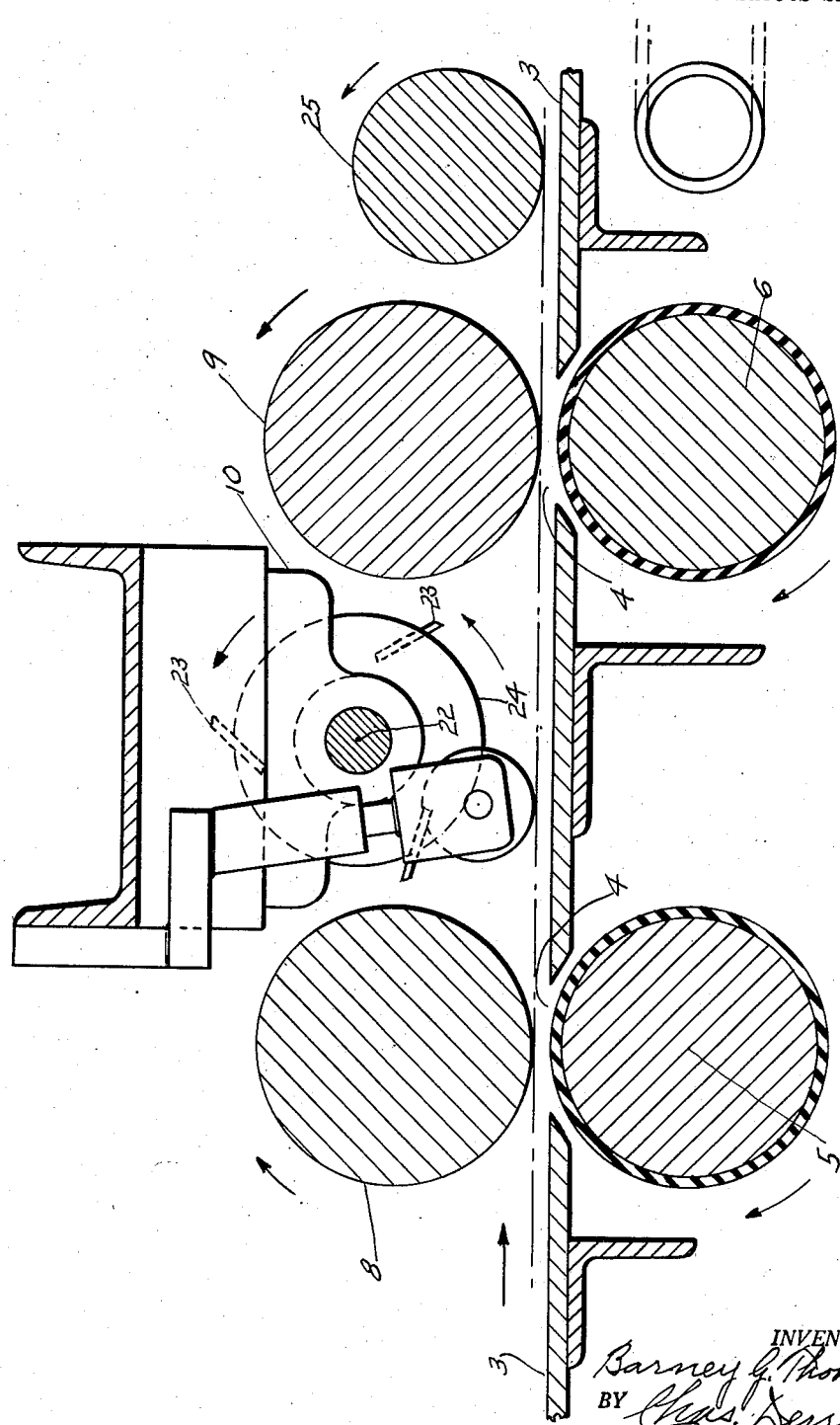

By referring generally to the drawings it will be observed that Fig. 1 is a plan view of a machine made according to this invention; Fig. 2 is a front elevational view of the machine; Fig. 3 is a side elevational view of the machine; Fig. 4 is an elevational view of the other side of the machine; Fig. 5 is an enlarged detail view showing the relative positions of the main rollers, cutters, and sanding roller, and other parts; Fig. 6 is an enlarged detail view showing the cutter motor pulley and cutter pulley and connecting belt and supporting and other parts; Fig. 7 is an enlarged detail view of one of the main bearings; and Fig. 8 is an enlarged detail view of a revolvable cutter.

Similar reference numerals refer to similar parts throughout the several views.

Referring to the drawings in detail it will be seen that the machine comprises a main supporting structure of legs 1 and cross bars 2 with a flat top 3 attached thereon. The top is provided with slots 4 across its middle portion for the tops of rollers 5 and 6 to make contact with a sheet of plywood 7 or the like passing through the machine. Two upper rollers 8 and 9 are supported in bearings 10 and 11 attached to the edge portions of the flat top. The rollers 5 and 6 are supported in bearings under the edge portions of the flat top. Roller 5 is driven by its pulley 12 in contact with belt 13 in contact with pulley 14 on motor 15 for pulling the sheet of material through the machine as a result of the upper rollers 8 and 9 resting upon the sheet of material. A second motor 16 is supported on a bracket structure 17 above the sheet rollers. The bracket structure is pivotably connected at 18. A pulley 19 on the motor shaft has a belt 20 in connection with a double pulley 21 on shaft 22 that supports a plurality of cutters 23 held in slidable disks 24 adapted for cutting grooves in the sheet of material as it is pulled through the machine by the said rollers in contact with its upper and lower faces. A sanding roller 25 is supported by bearings 26 in the edge portions of the flat top. The sanding roller is provided with a pulley 27 for belt 28 that leads to the double pulley 21 for revolving the sanding roller. Guide bars 29 and 30 are attached by bolts 31 to the edge of the flat top as a guide for an edge of a sheet of material to make contact therewith as the sheet passes through the machine to thus keep the sheet in proper alignment with the cutter blades. An oblong shaped enclosure 32 with a chimney type top 33 is supported on the upper bracket structure that is pivotably connected, and is adapted for a suction passageway (not shown) to be connected thereto for drawing away shavings of wood or other material when the machine in in operation cutting grooves. A strip of leather 34 is attached to an edge of the housing as a closure. The panel of material shown in the machine is in its position after cutting the grooves 35 along its major axis. If it is desired to form square or oblong designs in the face of the material it would be necessary to pass again the material through the machine and have the cutters make grooves along its minor axis.

From the foregoing it will appear that the machine is adapted to cut a plurality of grooves parallel to each other in a piece of plywood of flat or sheet formation, or in similar material, and have the grooves spaced apart by adjusting the slidable cutter disks on their shaft to the desired positions.

The various parts of the machine may be made of any material suitable for the purpose, but I prefer to use good grades of metal. Also the machine and parts may be made in different sizes and capacities depending on how and where to be used.

While I have shown and described the preferred embodiment of my invention, I do not wish to limit the same to the exact and precise details of structure, and reserve the right to make all modifications and changes so long as they remain within the scope of the invention and the following claims.

Having described my invention I claim:

1. A groove cutting machine of the character described comprising a flat metal top, a plurality of vertical and cross bars as a structure for supporting said top, two main rollers supported in bearings under the top, said top having two slots in its middle portion, said rollers being positioned so their upper edges protrude through said slots, an electric motor mounted in the structure below the top, a pulley on the shaft of the motor, a pulley on an end of the shaft of one of the rollers, a belt mounted around the pulley on the motor shaft and the pulley on the roller shaft, another pulley mounted on the other end of the said roller shaft, a pulley mounted on the end of the shaft of the second roller, a belt mounted around the pulley on the first shaft and the pulley on the end of the shaft of the second roller, two rollers mounted over the said two rollers below the top and positioned and adapted to make contact with any flat sheet material while it is passing over the lower rollers, a second supporting structure attached above the said flat top, an electric motor mounted in this upper structure, a double pulley on an end of the shaft of this motor, a shaft, a plurality of disks mounted on this shaft, each of said disks having a plurality of groove cutting blades removably attached thereto, two bearings mounted in the upper structure, said shaft with disks thereon mounted in said bearings, a double pulley on an end of the shaft having the disks thereon, a belt around the pulley on the motor shaft and the pulley on the shaft having the said disks thereon, two additional bearings mounted in the upper structure, a sanding roller mounted on a shaft, this shaft being supported in said two additional bearings, a pulley on one end of this shaft, a belt around the double pulley on the shaft of the disks and the pulley on the end of the shaft of the sanding roller, a housing mounted tiltably on the said upper structure, a piece of leather attached as a closure on one lower edge of said housing, said housing terminating chimney fashion as means for attaching to an air suction device for removing shavings from the machine when in operation cutting grooves in plywood or the like.

2. A machine for cutting a plurality of similar grooves parallel to each other in a sheet of plywood and adapted for cutting an additional plurality of parallel similar grooves across the other grooves at a ninety degree angle compared with the other grooves comprising a flat top as a supporting table, a plurality of vertical and cross bars attached together as a structure for supporting the said top to which the structure is attached, two main rollers, bearings for said rollers, said rollers positioned under the top, said top having two slots in its middle portion across same, said rollers positioned so their upper circumference edges protrude through said slots for making contact with any flat material on said top and over the slots, an electric motor mounted in the structure below the top, a pulley on an end of a shaft in the motor, a pulley on an end of the supporting shaft of one of the rollers, a driving belt mounted around the pulley on the motor shaft and the pulley on the roller shaft, another pulley mounted on the other end of the said roller shaft with pulley thereon in contact with the motor pulley, a pulley mounted on an end of the shaft supporting the other roller, a driving belt mounted around the pulley on the first shaft and the pulley on the end of the shaft of the second roller, two rollers mounted over the said two rollers below the top and positioned and adapted for their circumference faces to make contact with any flat sheet material while it is passing over the lower rollers; a second supporting structure attached above the said flat top, an electric motor mounted in this upper structure, a double pulley mounted on an end of the shaft of this motor, another shaft, bearings supporting this last mentioned shaft, a plurality of disks mounted on this shaft, each of said disks having a plurality of narrow cutting blades removably attached thereto, a double pulley mounted on an end of the shaft having the disks thereon, a driving belt around the pulley on the motor shaft and the pulley on the shaft having the said disks thereon, two additional bearings mounted in the upper structure, a sanding type roller mounted on a shaft, this shaft supported in said last mentioned two bearings, a pulley on one end of this shaft a driving belt around the double pulley on the shaft of the disks and the pulley on the shaft of the sanding roller; an enclosure housing mounted tiltably on the said upper structure, a strip of leather attached as a closure on one lower edge of said housing, said housing converging upward chimney fashion as means for connecting to an air suction device for removing shavings from the machine when it is in operation cutting grooves in plywood or the like.

References Cited in the file of this patent

UNITED STATES PATENTS

| | | |
|---|---|---|
| 18,171 | Batcheller | Sept. 8, 1857 |
| 109,005 | Hall | Nov. 8, 1870 |
| 179,436 | Warren | July 4, 1876 |
| 206,534 | Brock | July 30, 1878 |
| 262,370 | Casey et al. | Aug. 8, 1882 |
| 481,983 | Thom | Sept. 6, 1892 |
| 1,300,241 | Blood | Apr. 15, 1919 |
| 1,820,445 | Craft | Aug. 25, 1931 |
| 2,604,129 | Johnson | July 22, 1952 |